United States Patent [19]
Greiner

[11] Patent Number: 5,144,573
[45] Date of Patent: Sep. 1, 1992

[54] BARREL SHIFTER WITH PARITY BIT GENERATOR

[75] Inventor: Alain Greiner, Paris, France
[73] Assignee: Bull S.A., Paris, France
[21] Appl. No.: 622,761
[22] Filed: Dec. 5, 1990

[30] Foreign Application Priority Data
Dec. 7, 1989 [FR] France .................. 89 16174

[51] Int. Cl.$^5$ .................. G06F 5/01; G06F 11/10
[52] U.S. Cl. .................. 364/738; 364/715.08; 364/49.4
[58] Field of Search .......... 364/715.08, 738; 371/49.4

[56] References Cited

U.S. PATENT DOCUMENTS

| | | | |
|---|---|---|---|
| 3,045,209 | 7/1962 | Pomerene | 340/147 |
| 4,462,102 | 7/1984 | Povlick | 371/49 |
| 4,533,992 | 8/1985 | Magar et al. | 364/200 |
| 4,556,978 | 12/1985 | Kregness et al. | 371/49 |
| 4,839,840 | 6/1989 | Tokumaru | 364/715.08 |
| 4,901,263 | 2/1990 | Ho et al. | 364/715.08 |
| 4,999,796 | 3/1991 | DeWitt et al. | 364/715.08 |

FOREIGN PATENT DOCUMENTS
2149768 3/1973 France.

OTHER PUBLICATIONS
Pseudo Nibble Parity for Fast Shifter Parity Predict IBM Tech. Disclosure Bulletin, vol. 31 No. 12 May 1989 pp. 262-266.

Primary Examiner—David H. Malzahn
Attorney, Agent, or Firm—Weingarten, Schurgin, Gagnebin & Hayes

[57] ABSTRACT

A barrel shifter circuit is provided for use with the arithmetic and logic units of a computer. The circuit includes a generator of a parity word composed of parity bits, each associated with one of a plurality of groups of n bits, each group of n bits being obtained by partitioning input words A and B. The circuit also includes a parity matrix associated with a shift matrix for producing the parity bits of the groups of n consecutive bits that constitute an output word S, provided via parity output lines Q.

13 Claims, 3 Drawing Sheets

FIG_1
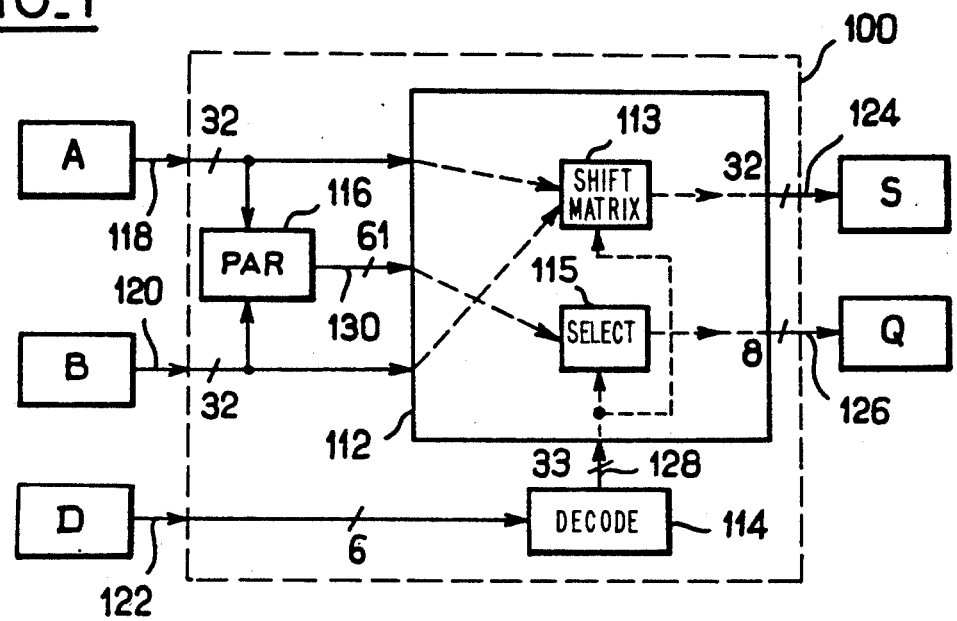
FIG_2
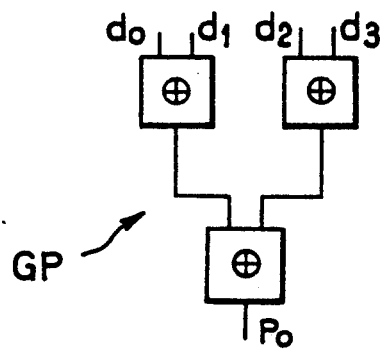
FIG_3
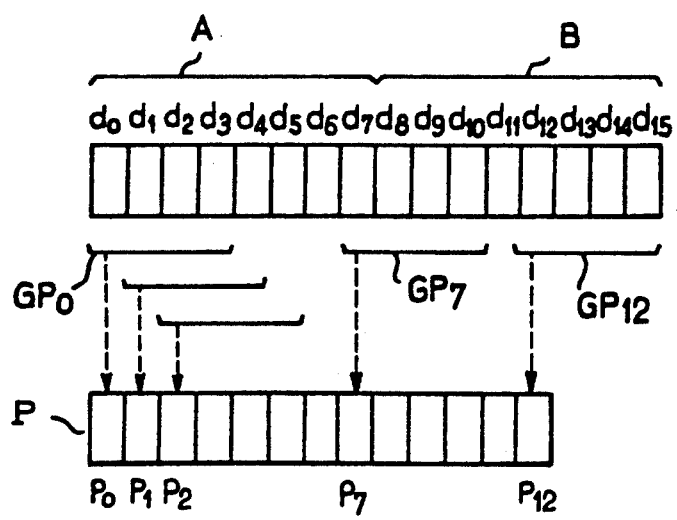

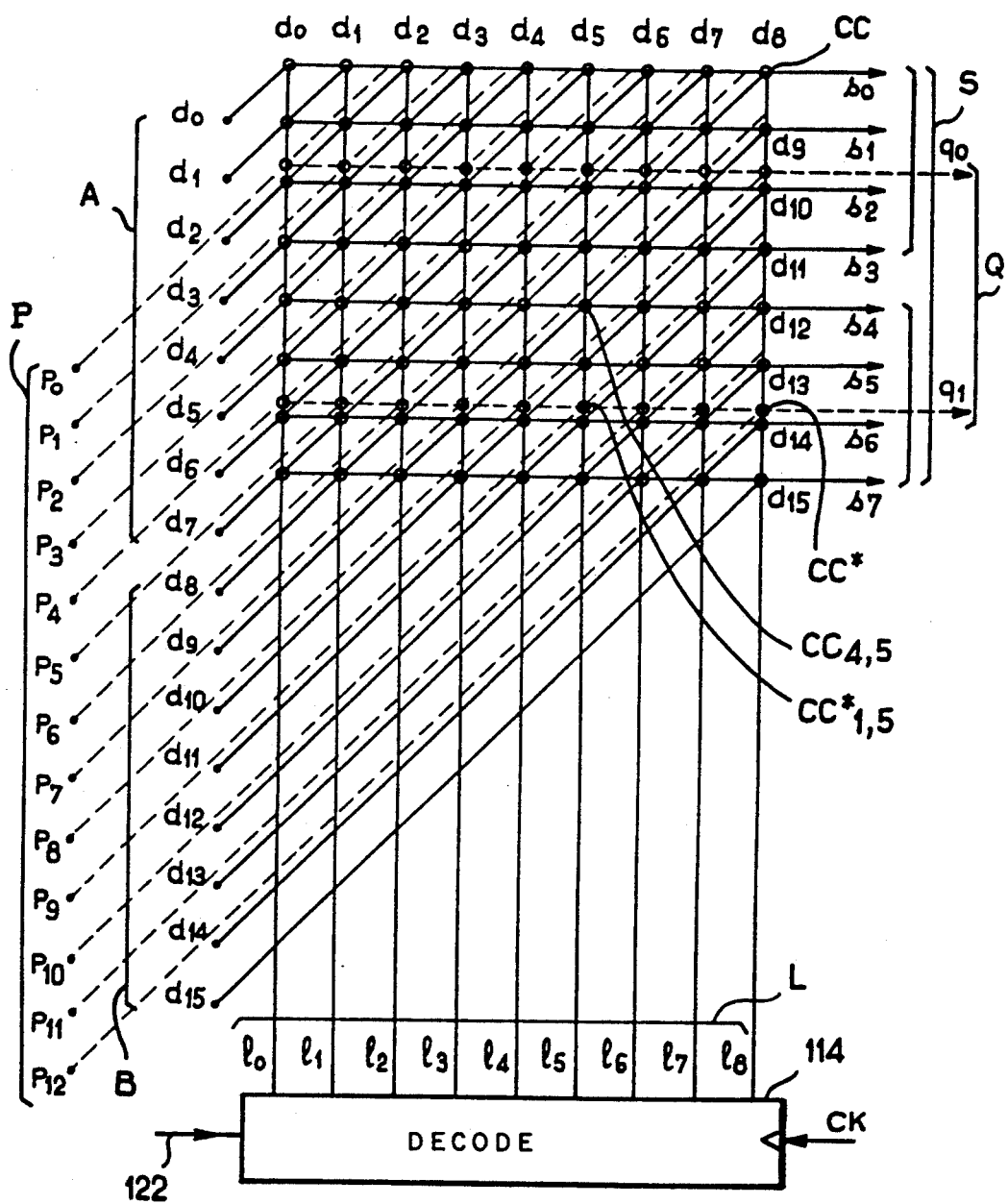
FIG_4

BARREL SHIFTER WITH PARITY BIT GENERATOR

FIELD OF THE INVENTION

This invention relates to a barrel shifter for use with the arithmetic and logic units of a computer, and particularly to a barrel shifter of the type having means for supplying, as a function of selection signals coming from a decoding circuit, an output word composed of M consecutive bits extracted from a basic word of N1 bits which is formed, for example, from two input words of N bits each.

BACKGROUND OF THE INVENTION

Barrel shifters are widely used for making rightward, leftward, and circular shifts of words of N bits, depending on the loading mode. Rightward shifts ar effected by setting the left input word to zero, rightward shifts by setting the right input word to zero, and circular shifts by setting the two input words to be identical to the word to be shifted.

In general, computer designers attempt to ensure the integrity of their systems by detecting and eliminating binary data corrupted by logic errors or physical malfunctioning of the system. The use of parity bits associated with the data is a convenient method of error detection while the data is being processed, either during logic operations or data shifting. First, each data word is subdivided into several fields or groups of bits. Then, "exclusive-OR" logic circuits are used to calculate the parity bit associated with each group. However, this operation requires time to generate the parity to be checked, particularly when the width of the group requires several exclusive-OR gate stages arranged in a cascade.

In particular, when the data is processed by an operator such as a barrel shifter, it is sometimes useful to calculate the parity bits associated with each result coming from the exclusive-OR operator. This calculation can be made by the usual method using the result itself. However, there is significant delay between the time that the parity information is calculated and the moment when the information is available for subsequent processing.

SUMMARY OF THE INVENTION

The barrel shifter of the invention includes means for forming a parity word composed of parity bits associated with each respective group of n consecutive bits that can be obtained by partitioning a basic word, and includes selection means controlled by selection signals for producing the parity bits from groups of n consecutive bits which constitute the output word (n being a divisor of M). The means for forming a parity word are arranged in parallel with a decoding circuit such that the parity word and the selection signals are produced simultaneously. Thus, the machine time necessary for decoding the shift value is also used to precalculate the parity values of all the groups of bits that can be obtained by partitioning the basic word. The parity values are then provided together with the output word.

According to a first embodiment of the invention, the barrel shifter includes a shift matrix with N1 data input lines and M output lines; a decoding circuit able to activate, as a function of a command signal representing the value of the shift to be effected (which is between 0 and N1−M) a corresponding selection line to supply a data output word of n bits via the output lines; a plurality of parity-generating circuits associated with the n-bit data word that can be extracted from the input lines (to form one parity word N1−n+1 bits long); and a parity bit selection circuit controlled by the decoding circuit to supply the parities of the n-bit words via the parity output lines. This arrangement allows a decoding circuit common to the shift matrix and the parity bit selection means to be used. Advantageously, the parity bit selection circuit includes a selection matrix with N1−n+1 parity input lines and k parity output lines (where k=M/n) controlled from the decoding circuit by selection lines as a function of the shift value to be effected.

According to a particular embodiment of the barrel shifter of the invention, the parity selection matrix is interlaced in the shift matrix, with parity input lines (pi) parallel to the data input lines (di) in an arrangement of one parity line (pi) associated with one (di+2) of n data input lines of each group of n consecutive bits that can be extracted from the basic word (for example, for n=4, di, di+1, di+2, and di+3), parity output lines (qi′) parallel to the data output lines (si) according to an arrangement of one parity output line (qi′) associated with one (s(ni′+2)) of the output lines forming a group of n consecutive bits belonging to the output word (for example, for n=4, s4i′, s4i′+1, s4i′+2 and s4i′+3), each selection line (lj) controlling the status of an output line (si) from the status of the data input line d(i+j) and the status of an output line q(i′) from the status of the parity input line p(ni′+j).

This particular arrangement allows very significant savings in surface area used as compared with the surface are required by the use of two distinct matrices. For example, when the interlaced matrices incorporate switching transistors in a chip made by preloaded CMOS technology, the increase in surface area is only about 15%, as compared with the surface area of the switching shift matrix of a simple barrel shifter without the capacity for generation of parity bits.

DESCRIPTION OF THE DRAWING

The invention will be more fully understood from the following detailed description, in conjunction with the accompanying figures, in which:

FIG. 1 is a schematic representation of a barrel shifter according to the invention;

FIG. 2 is a schematic representation of a parity bit generating circuit used in the circuit illustrated in FIG. 1;

FIG. 3 is an operational schematic illustrating the formation of the parity word in the present invention;

FIG. 4 is a schematic representation of the interlaced selection matrices used in the barrel shifter of the invention.

DESCRIPTION OF THE PREFERRED EMBODIMENT

Figure 5:
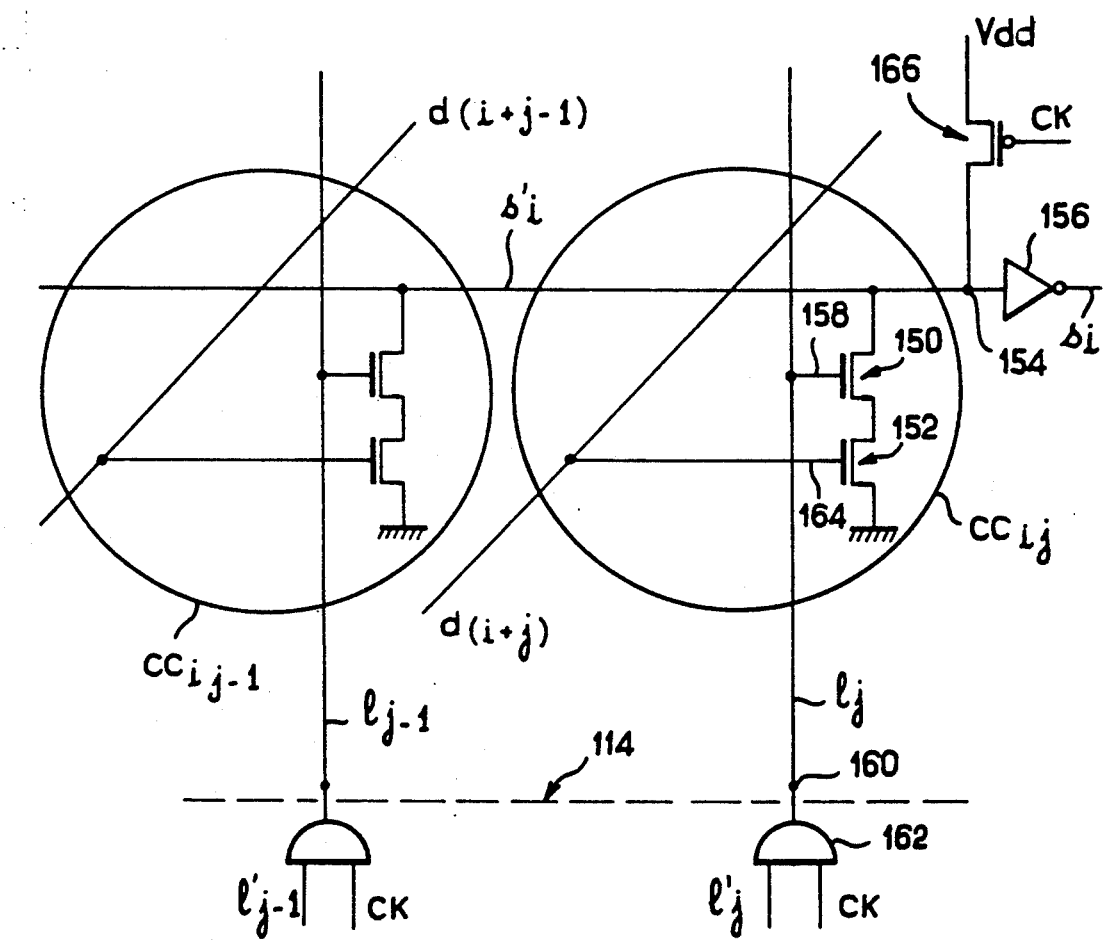
FIG. 5 is a schematic representation of a switching cell made by CMOS technology and used in the selection matrices illustrated in FIG. 4.

According to an embodiment of the invention described here as a nonlimiting example, a barrel shifter 100 in FIG. 1 includes a double selection matrix 112 (incorporating a shifted word selection matrix 113 and a parity selection matrix 115), a decoding circuit 114, and a parity word generating circuit 116. The barrel shifter 100 has two sets or two buses of N data input lines 118 and 120, labeled from do to dN−1 for bus 118 and labeled dN to d(2N−1) for bus 120, shift control lines 122, a set of M lines 124 for data output after shifting, labeled sO to s(M−1), and a set of k parity output lines, labeled q0 to q(k−1).

Thus, the barrel shifter 100 is designed to generate the parities of k groups (or multiplets) of an n bit size which, after shifting, constitute the output word of an M bit size. In current applications, the size M of the output word is equal to that (N) of each of the input words, i.e. M=N, the size of the basic word N1 then being equal to 2N. As a nonlimiting example, in the variant described here of the embodiment of the invention and illustrated in FIG. 1, the sizes of the input and output words are 32 bits (M=N=32) and the size n of the multiplet is 4 bits (n=4), with the parity output then having a size of 8 bits (k=8). However, the example shown in FIGS. 3 and 4 and provided for illustration has been chosen with M=N=8 bits and n=4 bits (k=2) so as not to complicate the drawings.

Considering FIG. 1, the concatenation of the two input words with size N (for example, N=32) gives the possibility of extracting, by shifting, a number L=N1−M+1 (for example, 33) of groups different from M (for example, M=32) consecutive bits and able to form the output word, including the zero shift. For this purpose, shift selection matrix 113 is controlled by L selection lines 128 (labeled lo to l(N1−M)) coming from the output terminals of decoding circuit 114. Decoding circuit 114 can be of a classical type, for example with a binary coded input value. In this case, we have a number C of shift control lines 122 such that $2^C \geq N1-M+1$, these lines being associated with a register D for inputting the shift value.

As shown in FIG. 1, input lines 118 and 120 are associated with two data registers A and B while output lines 124 and 126 are associated with two registers, one a data output register S and the other a parity output register Q.

Data lines 118 and 120 are also connected to the input terminals of the PAR circuit 116 that generates the parity word. The PAR circuit 116 includes a set of elementary circuits GP, each generating one parity bit.

Referring to FIG. 2, each elementary circuit GP has several inputs by cascading several "exclusive-OR" circuits, each having two inputs. FIG. 2 illustrates the particular case of a circuit with 4 inputs designed for generation of one parity bit per quartet. Recall that the parity bit (labeled pi) will assume the value 1 if the number of bits with value 1 in the multiplet considered is odd and will assume the value 0 if it is even.

Generation of the parity word in circuit 116 is effected as follows, illustrated schematically in FIG. 3. After concatenation in an appropriate register of input words A and B (in the same order as that used for shifting), each parity bit pi is generated from all the multiplets of consecutive bits (in this case quartets) that it is possible to extract. The number of multiplets is equal to 2N−N+1 (for N1=2N), i.e., 61 in the example illustrated in FIG. 1, and 13 in the example illustrated in FIGS. 3 and 4. This generation of parity bits is effected in a register P by the GP circuits (GPo to GP(2N−n)) in parallel, almost simultaneously with the decoding of the shift command sent via line 122. The parity signals are supplied to N1−n+1 input lines 130 (labeled po to p(2−Nn)) of the parity selection matrix 115 before validation by a clock signal CK of the selection signal generated by decoding the circuit 114.

The double selection matrix 112 shown schematically in FIG. 4 shows the interlacing of shift matrix 113 and parity matrix 115. Shift matrix 113 has input lines (do to d7 and d8 to d15) for words A and B, respectively, output lines S (so to s7), and selection lines (l0 to l8). Parity matrix 115 has input lines (po to p12), output lines (q0 to q1), and selection lines (l0 to l8), the latter lines being common and in fact the same as those of shift matrix 113.

From the topological standpoint in a particular embodiment in CMOS technology, selection lines L (the set of vertical lines shown in FIG. 4) are on metal layer 1, output lines S and Q (horizontal lines shown in FIG. 4) are on metal layer 2, and data lines A, B, and P are arranged in a two-layer staircase to allow crossings in a general arrangement of oblique parallel layers (metal layer 1 for the vertical path and metal layer 2 for the horizontal path above the selection lines with interlayer metal connection at each change of orientation). Moreover, lines A and B are contiguous to ensure the concatenation of words A and B, and lines P are interlaced in lines A and B according to the arrangement shown in FIG. 4. Likewise, output lines S and Q are disposed in parallel interlaced layers which cover not only input lines A, B, and P but also selection lines L running vertically. One input line, one output line, and one selection line meet at a switching cell CC whose schematic, shown in FIG. 5, will be presented hereinbelow.

From the functional standpoint, when a switching cell CC is validated by the associated selection line, it reproduces in the associated output line the logical value of the associated input line (oblique line). When it is not validated, cell CC is kept in a state of high impedance.

The particular topological arrangement of FIG. 4 (output lines S and selection lines L perpendicular, staircase input lines oblique, preferably at a 45° angle) has the advantage of optimizing the surface area occupied. Thus, shift matrix 113 has M lines and 2N−M+1 columns (or, in FIG. 4, a 3×9 matrix) and parity matrix 115 has k lines and 2N+1 columns (or, in FIG. 4, a 2×9 matrix). This topology is used in the practical embodiment of double selection matrix 112 in the form of an LSI microcircuit in CMOS technology.

More precisely, parity input lines (pi) have a staircase arrangement parallel to that of the data input lines (di) according to an arrangement of a parity line (pi) associated with a line (in the particular case illustrated in FIG. 4, line (di+2) for example) of the n=4 data input lines of each group of n consecutive bits that can be extracted from the basic word (di, di+1, di+2, and di+3).

Likewise, parity output lines (qi') are parallel to output lines (si) according to an arrangement of a parity output line (qi') associated with a line (in the particular case illustrated in FIG. 4 where (pi) is associated with (di+2), line (s(ni'+2)) to keep the correspondence between parity and group of consecutive bits) of the n=4 output lines (sni', sni'+1, sni'+2, sni'+3) forming a group of n consecutive bits belonging to the output word. Thus, parity output lines (qi') are regularly spaced every n output lines (si).

Finally, each selection line (lj) controls, via the switching cell CCij, the status of output line (si) from data input line d(i+j) and via switching cell CC*i'j, the status of output line (qi') from parity input line p(ni'+j).

FIG. 5 represents a switching cell CCij associated with an input line d(i+j), with output line (si), and with selection line (lj). This arrangement uses so-called "preloaded CMOS" technology where each horizontal line (relative to FIG. 5) of the matrix corresponds to a line (s'i) which is preloaded at a positive voltage Vdd during the so-called clock signal preloading phase (signal CK=0 during the preloading phase). During the so-called clock signal CK evaluation phase (signal CK=1 during the evaluation phase), this line (s'i) assumes a logic state matching the output value (si). To do this, each preloaded line (s'i) is connected to the input 154 of an inverter 156 whose output corresponds to the output line (si). Each switching cell CC is principally composed of two NMOS transistors 150 and 152 wired in series. The drain of transistor 150 is connected to the preloaded line (s'i) directly at input 154 of inverter 156 while the source of transistor 152 is connected to the ground (low-level potential) of the circuit. The gate 158 of transistor 150 is connected to the selection line (lj), more precisely to the output 160 of a validation AND gate 162 incorporated into decoding circuit 114. The AND gate 162 receives at the input the corresponding signal (l'j) generated in decoding circuit 114 and clock signal CK (validation being effected during the evaluation phase where CK=1). The gate 164 of transistor 152 is connected to data input line d(i+j) (for example for a shift of 5 units, or j=5, the value of bit 4 of the output word, or s4, will be equal to that of data bit d9).

Moreover, a preloading PMOS transistor 166 is connected by its source to a voltage source Vdd and by its drain to line (s'i). This PMOS transistor 166 receives clock signal CK at its gate 168.

If switching cell CC* belongs to parity matrix 115, its basic electrical schematic remains unchanged. However, selection line (lj) is associated with an output line (qi') through a preloaded line (q'i') and with a parity data line p(ni'+j) (for example for a shift of five units (j=5), the parity value of quartet 1 (n=4, i'=1) of the output word will be that of the parity bit of line p9).

The switching cells operate as follows: with each clock cycle (not shown) of the barrel shifter, the CK signal assumes first a low value (CK=0 during the preloading phase) then a high value (CK=1 during the evaluation phase). During the so-called preloading phase with CK=0, PMOS transistor 152 conducts and the input of inverter 156 is brought to potential Vdd. Moreover, output 160 of AND gate 162 is brought to a low level during this entire preloading phase. As a result, NMOS transistor 150 is blocked. During the so-called evaluation phase where CK=1, PMOS transistor 166 is again blocked while signal CK=1 is sent to the inputs of all the AND gates controlling the selection lines at the output of decoding circuit 114. Depending o the shift value transmitted by control line 122, a single pre-selection line, for example (l'j), will be activated and raised to a high value (l'j=1). Thus, output 160 of the corresponding AND gate 162 and the entire corresponding selection line (lj) associated with column (j) of the shift and parity matrices controlling grids 158 of NMOS transistors 150 is brought to a high potential, which will have the effect of causing these same transistors 150 to conduct, thus allowing the values of signals (di+j) and p(ni'+j) to be read.

In the case where d(i+j)=0, gate 164 of transistor 152 remains at a low voltage, keeping the latter in a blocked state. Line (s'i) remains at a high level which delivers a low-level output signal (si=0) at the output of inverter 156. Conversely, when d(i+j)=1, the gate 164 is brought to a high level which causes transistor 152 to conduct. Blockage of transistor 166 and causing transistors 150 and 152 to conduct cause the voltage of line (s'i) to drop to a low level. The output of inverter 156 then switches to the high level (si=1).

Thus, during this evaluation phase, all the output lines (si) and (qi') activated by the same selection line (lj) will be representative of the binary values present in the associated data and parity lines. It should be noted that the time required for SEL circuit 114 to decode the shift value and the time required for PAR circuit 116 to generate the parity word are of the same order; this allows synchronism to be ensured in terms of availability of output words and parities of the groups of bits of which these words are composed. In fact, all the operations of shifting and generating parity bits of the multiplets of which the output word is composed are carried out during a single clock cycle.

Moreover, the interlacing of the shifting and parity matrices saves considerable space when the components are being integrated in a chip. In practice, the physical limitation is the minimum required spacing between two parallel transistor interconnection lines in one of the chip metallization layers (in the particular case described, for metal layer 1, the positioning of the lines of metal layer 2 being predetermined). For a chip based on a single shift matrix for two input words of 32 bits and one output word also of 32 bits (2×32 inputs, 32 outputs, and 33 selections), a chip according to the invention with generation of parity bits of each quartet of the output word (comprising at most 61 parity inputs and 8 parity outputs) has an increased matrix active surface area of about 15%. However, without departing from the scope of the invention, another embodiment thereof (not shown) has the two matrices, the shift switching matrix and the parity matrix, structured physically separately, each around one specific chip (or one microcircuit).

Other modifications and implementations will occur to those skilled in the art without departing from the spirit and the scope of the invention as claimed. Accordingly, the above description is not intended to limit the invention except as indicated in the following claims.

What is claimed is:

1. A barrel shifter comprising:
   a decoding circuit for providing a plurality of selection signals;
   means (113) for supplying, responsive to the plurality of selection signals coming form the decoding circuit (114), an output word composed of M consecutive bits extracted from a basic input word of N1 bits;
   means (116) for forming a parity word composed of the parity bits corresponding to respective groups of n consecutive bits that can be obtained by partitioning the basic word; and
   selection means (115), respective to the means for forming a parity word, and controlled by said selection signals to produce the parity bits of the groups of n consecutive bits that constitute the output word (n being a divisor of M).

2. The barrel shifter of claim 1 wherein said means (116) for forming the parity word is connected in parallel with said decoding circuit (114) such that the parity word and the selection signals are produced simultaneously.

3. The barrel shifter of claim 1 wherein:
the basic word is formed of two input words, each being of size N;
the input and output words are of the same size 32; and
the size n of the groups of the output word whose parities are being generated is equal to 4.

4. The barrel shifter of claim 2 wherein said circuit (115) for selecting the parity bits includes a selection matrix with $N1-n+1$ parity input lines (130) and k parity output lines (126) (where $M=kn$), and wherein said circuit (115) is controlled from decoding circuit (114) by selection lines (lj) as a function of said shift value to be effected.

5. The barrel shifter of claim 4 wherein said parity selection matrix (115) is interlaced in said shift matrix (113) with parity input lines (pi) parallel to the data input lines (di) according to an arrangement of one parity line (pi) associated with one (di+2 for example) of the n data input lines of each group of n consecutive bits that can be extracted from the basic word (for example, for n=4, di, di+1, di+2, and di+3), and wherein parity output lines (qi') are parallel to the data output lines (si) according to an arrangement of one parity output line (qi') associated with one (line s(ni'+2)) of the output lines forming a group of n consecutive bits belonging to the output word (for example for n=4, s4i', s4i'+1, s4i'+2, and s4i'+3), each selection line (lj) controlling the status of one output line (si) from the status of data input line d(i+j) and the status of one output line (qi') from the status of parity input line p(ni'+j).

6. The barrel shifter of claim 5 wherein each output line (si), (qi') is associated with a set of $L=Ni-m+1$ switching cells CC, CC* arranged in series in a line (s'i), (q'i') that is preloaded by a preloading circuit (166).

7. The barrel shifter of claim 6 wherein the preloading circuit (166) is a series arrangement of two NMOS transistors (150, 152) controlled respectively by an associated input line d(i+j), p(ni'+j) and an associated selection line (lj).

8. The barrel shifter of claim 1 wherein the means for supplying is a shift matrix (113) with N1 data input lines (118, 120) and M output lines (124).

9. The barrel shifter of claim 1 wherein the decoding circuit (114) activates a selection line (128), in accordance with a control signal representative of the value of a shift to be executed, so as to provide the output word.

10. The barrel shifter of claim 9, wherein the value of a shift to be executed is between 0 and $N1-M$.

11. The barrel shifter of claim 1, wherein the means for forming a parity word includes a plurality of parity generating circuits (116), each parity generating circuit being associated with a group of n bits extracted from the basic input word.

12. The barrel shifter of claim 11, wherein the means for forming a parity word forms a parity word of length $N1-n+1$ bits.

13. The barrel shifter of claim 1, wherein the selection means (115) includes a circuit for selecting parity bits, responsive to the decoding circuit, for supplying the parity of each group of n bits of the output word.

* * * * *